United States Patent
Vecchio

(10) Patent No.: US 6,701,240 B2
(45) Date of Patent: Mar. 2, 2004

(54) METHOD OF STEERING AN AUTOMATIC TRANSMISSION

(75) Inventor: Maurizio Vecchio, Meckenbeuren (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 55 days.

(21) Appl. No.: 10/094,307

(22) Filed: Mar. 7, 2002

(65) Prior Publication Data

US 2002/0160881 A1 Oct. 31, 2002

(30) Foreign Application Priority Data

Mar. 7, 2001 (DE) .......................... 101 10 780

(51) Int. Cl.$^7$ .............................................. F16H 61/06
(52) U.S. Cl. .......................... 701/51; 701/52; 477/156; 477/127
(58) Field of Search .............................. 701/51, 52, 82, 701/83, 84, 87, 90; 74/733.1; 477/156, 127

(56) References Cited

U.S. PATENT DOCUMENTS

| | | | |
|---|---|---|---|
| 4,529,072 A | | 7/1985 | Oguma et al. ................. 192/52 |
| 5,674,155 A | * | 10/1997 | Otto et al. ................... 477/176 |
| 5,946,984 A | * | 9/1999 | Nitsche et al. ............. 74/733.1 |

FOREIGN PATENT DOCUMENTS

| | | | |
|---|---|---|---|
| DE | 100 10 815 A1 | 12/2001 | ........... F16H/61/06 |
| EP | 0 310 277 A2 | 9/1988 | ........... B60K/41/06 |

* cited by examiner

Primary Examiner—Marthe Y. Marc-Coleman
(74) Attorney, Agent, or Firm—Davis & Bujold, PLLC

(57) ABSTRACT

A method of driving a vehicle having an automatic transmission with an electronic control device input with a clutch pressure through the loading standing device of a clutch where the clutch pressure is isolated according to the gearbox input factor and a gear as a characteristic curve in an electronic driving device and the clutch pressure of a clutch along the power flow path is defined during the motion outside the gear change according to the real transmission capability of the clutch.

8 Claims, 1 Drawing Sheet

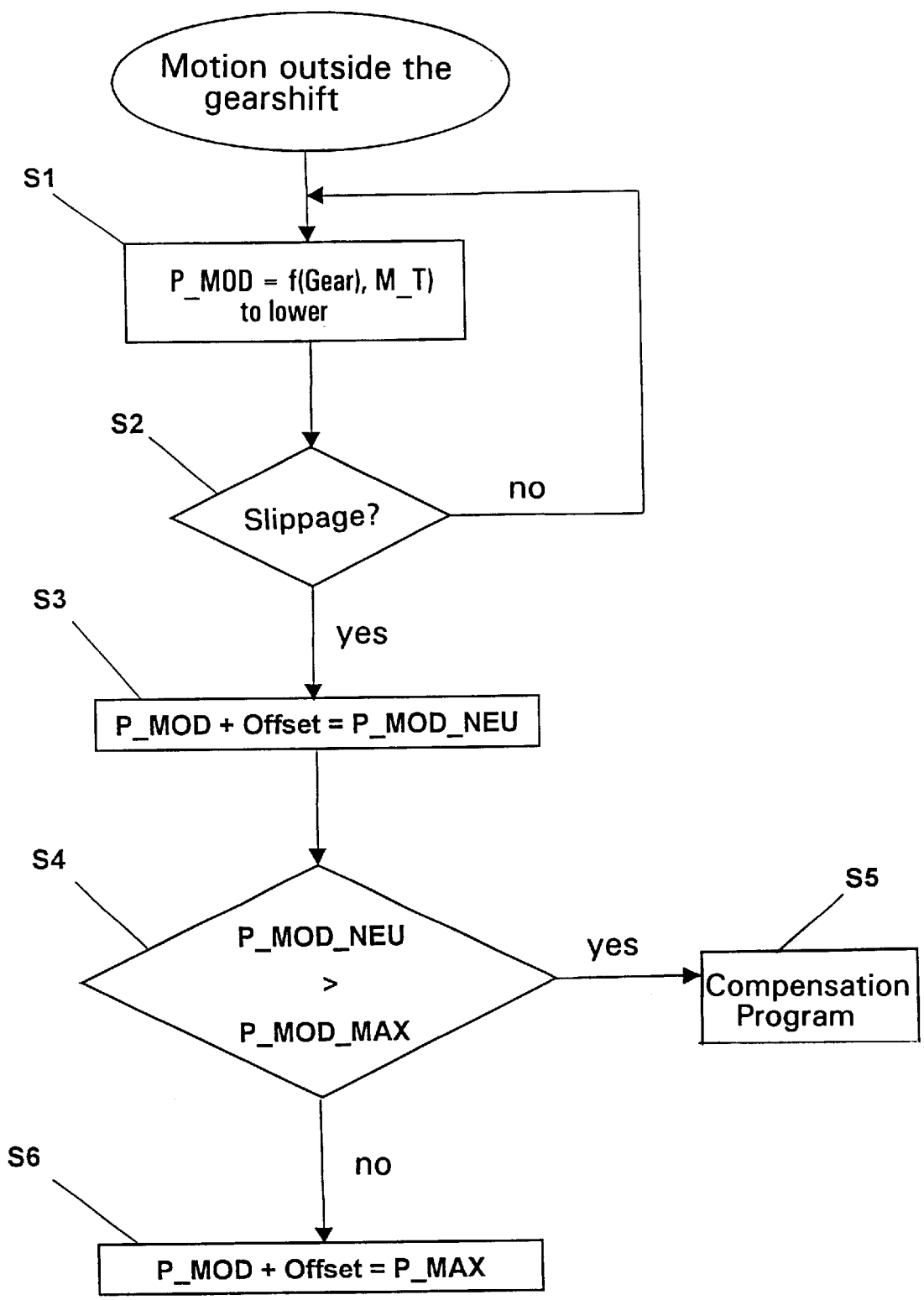

METHOD OF STEERING AN AUTOMATIC TRANSMISSION

FIELD OF THE INVENTION

This invention relates to a method of driving of a vehicle with automatic transmission.

BACKGROUND OF THE INVENTION

It is known from practice that in a planetary type a conventional automatic gearbox usually contains a hydrodynamic converter with a manually switching gearbox, wherein the converter in a given operation is defined according to effective power flow inside the planetary group through the clutch and brakes, respectively. As a rule, to control the pressurization of these clutches an electronic gear driving with an electronic driving device is utilized. This control is set, for example, through electromagnetic and electrohydraulic position links of hydraulic pressure, which is set, for instance, next to multi-plate clutch rest. This filling pressure of the clutch is isolated by the known gear driving of a state outside a gear change depending on gearbox input factor and, correspondingly, motor factor and a certain operation step as a characteristic curve in an electronic driving device.

According to the notion of clutch pressure-characteristic curve, in practice, a minimum coefficient of friction was calculated according to component tolerance and eventual incoming damage to the clutch, which was taken into consideration while calculating the necessary pressure in the clutch according to the characteristic curve. In order to avoid the gearbox damage, the notion of characteristic curve as the "weakest, i.e., the greatest required pressurization, in a particular/respective gear-switching clutch was applied to the clutch pressure.

As a minimum transmission capability of the clutch provides for a possible decrease of clutch friction coefficient and respectively for brakes or insufficient factor interface of the engine, the minimum transmission is applied to distributed characteristic curve of clutch pressure with a respectively strong safety in an electric driving gear. Also with a properly functioning system concerning disadvantages, very high-pressure reserves must become available which general lead to deterioration of the gearbox efficiency.

In spite of such, strong safety default for the characteristic curve of clutch pressure, it has shown, that at an extremely strong waste of friction coefficient of clutch and respectively of brakes or at detecting a false motor factor out of which the gearbox speed factor is counted, the regular safety defaults are not sufficient to ensure the transmission capability of the clutch.

In German patent application DE 100 10 815, a technique for driving from load circuit of an automatic gearbox is described where during calculation of a pressure pattern for one during changing gear to the first, open clutch and a second, closing clutch a static engine factor, a dynamic engine factor, specific gear parameter and additionally a representing factor input of a ruling size are defined in a way that the value in a gear tolerance, including regulation, will become so definite that a target-flextime of the clutch will be at least approximately maintained. With the addition of a supplementary factor, obtained from the regulation, to the static engine factor, defined by driving, and to a dynamic engine factor, tolerance of electronics of automatic transmission, specific to a component, is known, by which a slip-time of the clutch can be stopped so that a theoretic slip-time is neither too long nor too short. Following is a foreseen adaptation of forward driving pressure of clutches, with which tolerance, strays, and low frequency modification of clutch friction coefficient and other parameters that influence shifting quality, can advantageously be balanced for the long-term and differential controller intervention reduces in the following shifts in a similar load.

The technique described in DE 100 10 815, however, limits itself to the phase of a switchgear during a loaded circuit and does not influence the clutch pressure-characteristic curve of the clutch outside the switching phase.

The task of the present invention is to provide a technique for driving of automatic transmission of a vehicle by establishing a characteristic curve of a clutch pressure for the state outside a gear change which will be thus improved. On the one hand, the efficiency of gearbox, in normal use, will improve and, on the other hand, will provide a sufficient control of the transmission capability in case of gearbox damage.

SUMMARY OF THE INVENTION

While the clutch pressure is applied, depending on gearbox input factor and a gear as a characteristic curve in an electronic driving unit, while a state outside a gearshift that depends on the real transmission capability of the clutch, is established, a very low safety default is selected which makes it possible to maintain the required pressure reserves and sufficiently improve the effectiveness of the gearbox.

In addition, according to the invention, the technique offers the advantage that the occurence of an insufficient transmission capability of the clutch and a clutch-slip outside gear-switches, which can lead to the damage or even to the clutch burning as well as result in gearbox failure, must be avoided.

BRIEF DESCRIPTION OF THE DRAWING

In the following description the invention technique will be explained by way of a schematically simplified FIGURE that shows the efficiency example. In addition it shows efficiency variants.

FIG. 1 shows a scheme of the process of invention techniques for driving a vehicle with automatic transmission, to which an electronic control device is isolated in a known way through electromagnetic and electrohydraulic control agents that adjust the clutch loading with a clutch pressure (P_MOD).

DETAILED DESCRIPTION OF THE INVENTION

The clutch pressure P_MOD usually depends on the gearbox input factor M_T, which shows the turbine factor, and consequently engine factor; and a respective operation as a characteristic curve for the gearshifts that come in question and isolate state outside a gearshift in an electronic control device.

In accordance with a module of electronic control device shown in the Figure, the clutch pressure P_MOD for a power flow of a stationary clutch during a state outside a gearshift is defined from now to depend on the real transmission capability of the clutch.

In addition, the clutch pressure P_MOD with which the clutch is filled outside gearshifts is lowered in the first step S1 until a slip in the next step S2 is achieved.

In the following step S3, the pressure value of clutch pressure P_MOD, in the case of recognizing slip at a relatively low default-value of the driving factor rate will be increase, so that a new clutch pressure P_MOD_NEU is generated.

During the default-value, which is clearly smaller than the value on the characteristic curve of clutch pressure P_MOD, initially applied safety default depending on the input factor of gearbox is defined, in an advantageous way it will be taken into consideration that an estimated handicap of the default value has different consequences for the whole system for support points of the gearbox. In this way, an estimated forward passed default in the area of output value from 0 bar, if necessary, will produce a theoretical clutch pressure in a negative field. At the default at a big adjacent gearbox, the input factor M_T cannot be sufficient. The regulation to the basic pressure of the clutch pressure P_MOD to the added default relevant to the adjacent gearbox input factor M_T clearly adds to the technique quality improvement.

In the following case the default, depending on the engine factor rate, will become definite and the correcting value for the clutch pressure P_MOD outside the gearshifts will be transmitted mainly through the factor rate.

In order to prevent possible clutch damage, a maximum clutch pressure P_MOD_MAX is not to be exceeded, and this will be examined in the following step S4. When it is established in the technique step S4 that the new calculated clutch pressure P_MOD_NEU is larger than the previously defined maximum value P_MOD_MAX, a compensation program will start in the following step S5, which will activate a gear at which the affected clutch will not stay in the power flow.

In case the new transferred clutch pressure P_MOD_NEU lies within acceptable limits in the control step S4, it will be pulled over for the correction in the following control step S6 as a clutch pressure P_MOD, which lies in an electronic gearshift of adjacent characteristic curves.

This module for modifying the clutch pressure P_MOD respectively to the correction of characteristic curve of the clutch pressure P_MOD, that depends on the real transmission capability of the clutch, can run constantly as a control routine while the vehicle is operating. There is an advantage, for instance, that an one-time damage of the gearbox this occurrence can be taken into consideration. An unexpectedly occurring slip, based on clutch damage, can quickly get a response by an increase in the clutch pressure P_MOD so that a sufficient transmission capability of the clutch is maintained.

It speaks for itself that it is also possible that clutch characteristic curve at the band end, for example, can be adjusted for the real transmission capability of the clutch by a vehicle manufacturer of a gearbox during a test run in a workshop.

In one variant implementation, it can also be foreseen in the following technique that the definite characteristic curves of the clutch pressure P_MOD, which were determined during a previous adaptation of a sufficient clutch pressure during a gearshift, can be corrected depending on the adaptation values. The adaptation of the clutch pressure P_MOD, during a shift phase, can be operated in different ways. There is one suitable technique for adaptation of regular/feedback catalytic/computer-controlled changing gear depending on gearbox input factor described in DE 100 10 815.

Instead of the following description of clutch pressure P_MOD decreases into a clutch slip the adaptation values of clutch pressure adaptation during the current gearshift on the operating range outside gearshift will then be transmitted, because it has shown that these adaptation values are also useful for the driving condition outside switching operation with suitable modifications.

The adaptations during running circuitry usually lie in an adaptation range from −0.8 bar to +1.2 bar and considered real deviations in clutch pressure structure and/or a coefficient of friction and/or interface inaccuracies. This means, both the deviations that appear during operation and tolerance and adaptations which will be detected on the band end of production will be taken into consideration.

In a preferred method of running the method the characteristic curve of clutch pressure P_MOD was initially applied with a low safety-default, where this characteristic curve following relevant adaptation values of a gear change adaptation under consideration of a respective gear and the existing support factors in gearbox were corrected. In order to be able to complete the operation from the beginning until the end with a very low safety-default and relevantly low pressure reserves a quick adaptation must follow at the correction spot of the clutch pressure P_MOD of definite characteristic curve to the clutch. This must be done before a gear, in which the clutch stays in power flow, is activated.

Bcause the intelligent gearbox driving must know the transmission capability of the "weakest" clutches, switched on or off, and establish the adaptation value for it, this technique variant is possible only with the clutches, which are not activated by each gear change, right from the first gear, in all gears. In such a case, it is obvious that one has to combine the above described techniques with the clutch pressure P_MOD reduction into a slip of the clutch and the technique variant of transmitting the gained adaptation value from a running gear change during the correction of clutch pressure-characteristic curve.

On the other hand, the technique allows the use definite characteristic curves depending on adaptation values during a gear change with the correction of the clutch pressure P_MOD. When the clutch pressure-characteristic curves are initially applied with a high safety-default and then, according to its link, during a gear change the gained adaptation value is corrected and a negative and/or a positive adaptation value on the clutch pressure P_MOD, outside the gear change, is transmitted. In comparison to the above described technique variants the potential for improvement here is still lower.

| Reference Signs | |
|---|---|
| M_T | gearbox input factor |
| P_MOD | modified clutch pressure |
| P_MOD_MAX | maximum modified clutch pressure |
| P_MOD_NEU | new modified clutch pressure |
| S1 | Technique step |
| S2 | Technique step |
| S3 | Technique step |
| S4 | Technique step |
| S5 | Technique step |
| S6 | Technique step |

What is claimed is:

1. A method for compensating gear slippage in a vehicle having an automatic transmission controlled by an electronic control device, the method comprising the steps of:
   isolating a clutch pressure (P_MOD) via the electronic control device through at least one control agent of a clutch load input, in which the clutch pressure (P_MOD) is dependant on a gearbox input factor (M_T) and a gear;

selecting the gear from a characteristic curve in the electronic driving device;

determining the clutch pressure (P_MOD) of at least one of a plurality of clutches in a power flow by a state outside the gear change depending on the real transmission capability of the clutch;

adjusting the clutch pressure (P_MOD) by adding a slippage factor and a default value to obtain a new clutch pressure;

correcting the characteristic curve which defines the clutch pressure (P_MOD) according to at least one adaptation value, with the at least one adaptation value defined during a previous adaptation of a respective characteristic curve during a gear change.

2. The method according to claim 1, wherein the default value is defined according to a gearbox input factor (M_T).

3. The method according to claim 1, wherein an offset value is defined by an engine factor.

4. The method according to claim 1, further comprising the step of activating a gear dependant on a value of the clutch pressure (P_MOD), which has a larger maximum value (P_MOD_MAX).

5. The method according to claim 1, further comprising the step of leading the clutch pressure (P_MOD) through according to the real transmission capability of the clutch by means of a compensation program, and activating the compensation program when the vehicle is operating.

6. The method according to claim 1, further comprising the step of correcting the first clutch pressure (P_MOD) by defining the characteristic curve default value by combining a gear factor and at least one support factor.

7. The method according to claim 1, further comprising the step of minimizing a safety default for the correction of the characteristic curve which defines the clutch pressure (P_MOD) for a clutch in the power flow, before a gear is activated.

8. The method according to claim 1, further comprising the step of adjusting a corresponding value of a gearbox input factor (M_T) to obtain the gear change during the step in which adaptation values are defined for the later correction of clutch pressure (P_MOD) outside the gear change.

* * * * *